(12) United States Patent
Bangah et al.

(10) Patent No.: US 8,849,714 B2
(45) Date of Patent: Sep. 30, 2014

(54) VALUE EXCHANGE SYSTEM FOR USE WITHIN AN INTERNET-BASED SOCIAL NETWORK

(75) Inventors: Ganesh Kumar Bangah, Johor Bahru (MY); Tjen Tseng Siew, Johor Bahru (MY)

(73) Assignee: MOL AccessPortal Sdn. Bhd, Kuala Lumpur (MY)

( * ) Notice: Subject to any disclaimer, the term of this patent is extended or adjusted under 35 U.S.C. 154(b) by 0 days.

(21) Appl. No.: 13/390,929

(22) PCT Filed: Aug. 13, 2010

(86) PCT No.: PCT/MY2010/000143
§ 371 (c)(1),
(2), (4) Date: Feb. 16, 2012

(87) PCT Pub. No.: WO2011/021924
PCT Pub. Date: Feb. 24, 2011

(65) Prior Publication Data
US 2012/0150734 A1    Jun. 14, 2012

(30) Foreign Application Priority Data
Aug. 17, 2009 (MY) .................. PI 20093417

(51) Int. Cl.
*G06Q 40/00* (2012.01)
*G06Q 50/00* (2012.01)
*G06Q 20/10* (2012.01)
*G06Q 20/00* (2012.01)
*G06Q 20/38* (2012.01)

(52) U.S. Cl.
CPC .............. *G06Q 20/00* (2013.01); *G06Q 50/01* (2013.01); *G06Q 20/10* (2013.01); *G06Q 20/381* (2013.01)

USPC ................. 705/39; 705/26.1; 705/35; 705/44

(58) Field of Classification Search
USPC ....................... 705/26.1, 35, 39, 44
See application file for complete search history.

(56) References Cited

U.S. PATENT DOCUMENTS 7,953,654 B2 * 5/2011 Abifaker .................... 705/35
7,974,889 B2 * 7/2011 Raimbeault ................ 705/26.7
(Continued)

FOREIGN PATENT DOCUMENTS

WO   WO 2008/051796 A2    5/2008

OTHER PUBLICATIONS

International Search Report for International Application No. PCT/MY2010/000143 mailed Nov. 11, 2010.
(Continued)

*Primary Examiner* — Sara C Hamilton
(74) *Attorney, Agent, or Firm* — Rahman LLC

(57) ABSTRACT

Certain embodiments contemplate a computer-implemented method of enabling a value exchange between users of a SNS which functions within the confines of the SNS. Certain embodiments comprise an application which creates at least an interface to the value exchange system, a means for registration to enable users to register with the value exchange system, a means for receiving at the value exchange system, a value exchange transaction between a first user and a second user, wherein the users are members of a same internet-based social network and the value exchange system makes use of the internet-based social network account identifiers of the respective users to enable the communication of value exchange transactions between the users. The application may also create a value exchange means for debiting from or crediting to the value exchange system account of first and second users.

24 Claims, 12 Drawing Sheets

(56) References Cited

U.S. PATENT DOCUMENTS

| | | | |
|---|---|---|---|
| 8,160,943 B2* | 4/2012 | Smith et al. | 705/35 |
| 8,224,707 B1* | 7/2012 | Smith et al. | 705/26.1 |
| 8,224,727 B2* | 7/2012 | Hirson et al. | 705/35 |
| 2006/0085259 A1* | 4/2006 | Nicholas et al. | 705/14 |
| 2007/0143185 A1* | 6/2007 | Harmon et al. | 705/14 |
| 2007/0150537 A1* | 6/2007 | Graham | 709/203 |
| 2008/0034061 A1* | 2/2008 | Beares | 709/218 |
| 2008/0109239 A1* | 5/2008 | Harmon et al. | 705/1 |
| 2008/0109296 A1* | 5/2008 | Leach et al. | 705/10 |
| 2008/0114653 A1* | 5/2008 | Harmon et al. | 705/14 |
| 2008/0172344 A1* | 7/2008 | Eager et al. | 705/80 |
| 2008/0189189 A1 | 8/2008 | Morgenstern | |
| 2008/0208749 A1* | 8/2008 | Wallace et al. | 705/44 |
| 2008/0270248 A1* | 10/2008 | Brill | 705/26 |
| 2009/0012895 A1* | 1/2009 | Mehrabi | 705/39 |
| 2009/0089321 A1* | 4/2009 | Yang et al. | 707/102 |
| 2009/0094134 A1* | 4/2009 | Toomer et al. | 705/26 |
| 2009/0112773 A1* | 4/2009 | Song et al. | 705/36 R |
| 2009/0119212 A1 | 5/2009 | Liu et al. | |
| 2009/0182664 A1* | 7/2009 | Trombley | 705/42 |
| 2009/0192928 A1* | 7/2009 | Abifaker | 705/35 |
| 2010/0250687 A1* | 9/2010 | Smith et al. | 709/206 |
| 2010/0274653 A1* | 10/2010 | Hammad | 705/14.25 |
| 2010/0306099 A1* | 12/2010 | Hirson et al. | 705/38 |
| 2011/0125599 A1* | 5/2011 | Morin et al. | 705/26.1 |
| 2012/0116865 A1* | 5/2012 | Deguchi et al. | 705/14.39 |

OTHER PUBLICATIONS

International Preliminary Report on Patentability for International Application No. PCT/MY2010/000143 dated Dec. 5, 2011.

\* cited by examiner

VALUE EXCHANGE SYSTEM FOR USE WITHIN AN INTERNET-BASED SOCIAL NETWORK

FIELD OF INVENTION

This invention relates to the field of computer and information technology, and more specifically a value exchange system for enabling a value exchange between users of an internet-based social network, within the confines of the internet-based social network.

BACKGROUND

An internet-based social network is a platform which facilitates virtual social interaction between internet users, and participation in an internet-based social network site (SNS) requires membership and registration with the SNS beforehand. During the process of registration, the user submits a primary e-mail address which is used as the user's SNS account identifier. The account identifier, as the name suggests is a means of identifying a user, and communicating with the user within the confines of the SNS.

The advent and fast growing popularity of internet-based social networks, or social network sites (SNS) such as Facebook®, MySpace®, Twitter®, amongst a growing list of others has given rise to the creation of an ever-increasing number of applications that are written specifically to function or operate within the confines of a specific SNS, meaning that it may be accessed and utilized only by the members of that SNS when they are logged in to the SNS. Most applications are generally intended for social interaction and may cover a whole gamut of internet-based services, such as online games, music downloads, avatar downloads, electronic greeting cards, virtual gifts, to name just a few.

The wide acceptance of social network sites by internet users as a part and parcel of life and the resulting phenomenal growth in the number of users who are registered as members with one or more social network sites have led to an increasing number of individuals making use of a SNS as a commercial platform. Individual application developers/owners in particular, are taking the opportunity to generate income from their applications by charging a nominal fee for the use of their application. This is called 'monetizing' an application. The opportunities provided by a SNS are also being capitalized on a larger scale by commercial entities and even by charities as a channel for solicitation of donations.

This has created a need for a means for members of a SNS to send to and receive funds from other members of the same SNS, or to make payments to a merchant who is a member of the same SNS, for products or services purchased. To date, this has largely been accomplished through value exchange systems which reside and function outside the confines of the SNS, but which are linked to specific value exchange applications specifically written to function within the confines of a specific SNS.

An example of an existing value exchange application would be Spare Change™, which caters to members of SNSs such as Facebook® and MySpace®. A developer/owner of an application begins the process of monetizing an application by first registering a developer account with 'Spare Change™, and then setting up the application to receive payment via Spare Change™.

A member of a SNS such as Facebook® for example, seeking to make payment for the use of a particular application, such as the fees for downloading a song, obtaining credits to participate in a game takes notice that the application accepts payment by Spare Change™, proceeds to add the Spare Change™ application to his/her Facebook® account in order to facilitate payment. Doing so requires registration and the user will be assigned a Spare Change™ account.

The Spare Change™ application, at the point of making payment gives the user the option of selecting the source of funds through which payment is to be made, a value exchange system such as Paypal®, credit card or electronic funds transfer directly from the member's bank account. All of these are virtual payment channels, meaning that the payment transactions are carried out through the internet.

These options for making payments restrict the use of the application only to users possessing a credit card, or a bank account which is compatible with the application. This restriction limits the scope of members of a SNS who are eligible to make use of the application, and provides no alternative for users who are unable to make use of any of the payment methods provided by Spare Change™.

In view of the disadvantage discussed above, there is an unfulfilled need for a value exchange system that allows the option of making payment not only through virtual payment channels, but also through physical payment channels. It is therefore the objective of the present invention to provide a computer-implemented method of enabling a value exchange between users of a SNS which functions or operates within the SNS, which provides the additional option of making payment through physical payment channels.

SUMMARY OF THE INVENTION

An embodiment of the computer-implemented method of enabling a value exchange between users of a SNS which functions within the confines of the SNS according to the present invention, employs a system that comprises:

a) an application which creates an interface to the value exchange system, b) a means for registration to enable users to register with the value exchange system, wherein a user is assigned an account with the value exchange system after registration, c) a means for receiving at the value exchange system, a value exchange transaction between a first user and a second user, wherein the users are members of a same internet-based social network and the value exchange system makes use of the internet-based social network account identifiers of the respective users to enable the communication of value exchange transactions between the users, d) a notification means for computer generation of notifications of the value exchange transactions between the first and second users, and for the electronic transmission of the said notifications, and e) a value exchange means for debiting from or crediting to the value exchange system account of the first user the value to be exchanged in a value exchange transaction, and correspondingly crediting to or debiting from the value exchange system account of the second user the value to be exchanged.

The application which creates an interface to the value exchange system provides a means for a first user who is a member of an SNS to link and allow the application access to his/her SNS account. The step of linking and allowing the application access to his/her SNS account involves registration by the first user with the value exchange system, and the assignment of a value exchange system account, which the first user associates to his/her SNS account, in order to carry out value exchange transactions using the application with a second user who is also a member of the same SNS, who has also linked and allowed the application access to his/her SNS account, and who has also registered with the value exchange system and assigned an account with the value exchange system, which is associated to the second user's SNS account.

A value exchange transaction between a first user who has already been registered with the value exchange system and a second user who is a member of the same SNS, who has not registered with the value exchange system may take place subject to the second user linking and allowing the application access to his/her SNS account, and registering with the value exchange system and being assigned an account with the value exchange system which is associated with his/her SNS account.

The application which creates an interface to the value exchange system, apart from having the means to enable a value exchange transaction, may preferably also comprise a means for displaying one or more value exchange transactions that have taken place or are pending, and the value stored in a user's value exchange system account, a means for displaying a user's credit rating score in a user's value exchange system account and/or a means for displaying the balance of the value stored in a user's value exchange system account. Given the large number of different SNSs in existence, a version of the application written in accordance with the application programming interface of a specific SNS will be required.

The value exchange system account is associated to a user's SNS account by the user's SNS account identifier, and makes use of the SNS account identifiers of a first user to enable the communication of a value exchange transaction with a second user. A user who is a member of more than one SNS may associate his/her value exchange system account to the account identifier of each SNS he/she is a member of.

The first user when logged-in to the SNS may conduct a value exchange transaction relative to a second user using the application, and in doing so, the value exchange system sends a notification of the value exchange transaction to the second user's SNS account, to notify the second user of the value exchange transaction, and to obtain the second user's acceptance of the value exchange transaction. The second user when logged-in to the SNS, upon receipt of the notification from the value exchange system, may choose to accept the value exchange transaction using the application. The value exchange system then adjusts each user's value exchange system account according to the nature of the value exchange transaction.

In the embodiment of the computer-implemented method of enabling a value exchange between users of a SNS which functions within the confines of the SNS according to the present invention, a user who has already registered with the value exchange system may introduce value to his/her value exchange system account through a multitude of payment channels, and receive from the value exchange system, a notification confirming that the value has been introduced into the user's value exchange system account. The payment channels comprise of both physical payment channels and virtual payment channels.

The embodiment of the computer-implemented method of enabling a value exchange between users of a SNS which functions within the confines of the SNS according to the present invention may also comprise of the option for a user who is a member of a SNS to be registered as a merchant and be assigned a merchant account with the value exchange system, which enables a user registered as a merchant to carry out value exchange transactions in respect of the payment for the supply of a product or service offered to other users who are members of the same SNS, or for the refund of payments made and which also allows the user registered as a merchant the option of converting any amount of the accumulated value stored in his/her merchant account into currency.

BRIEF DESCRIPTION OF THE DRAWINGS

The invention is illustrated, though not limited by the following description of a preferred embodiment that is given by way of example only, with reference to the accompanying drawings in which.

DETAILED DESCRIPTION AND BEST MODE

The following description describes the invention in relation to the embodiment of the invention, specifically a computer-implemented method of enabling a value exchange between users of a SNS which functions within the confines of the SNS. The invention is not limited to the embodiment of the invention as it serves to exemplify the invention only and many possible variations and modifications are readily apparent without departing from the scope of the invention.

As the invention relates to internet-based social networks, implementation of the embodiment of the invention is via computer devices, or other electronic appliances which possess internet connectivity and web-browsing capabilities, and needless to say, a user will access a social networking site using a variety of client devices, such a personal computer, or any electronic or communication devices which possess internet connectivity, whether fixed or mobile.

The present invention being a computer-implemented method of enabling a value exchange between users of a SNS which functions within the confines of the SNS implies that the invention is implemented by a series of computer executed instructions (e.g., a computer program) which generally resides on a storage medium such as a hard drive of a server, or other computer readable medium known to persons skilled in the art such as magnetic optical drives, solid-state drives or magnetic tape drives.

Furthermore, the technological and operational aspects of internet-based social networks and the computer devices and electronic appliances used to access internet-based social networks are already well known to persons skilled in the art. Therefore, the description of the invention will not go into the inner workings of an internet-based social network or the said computer devices.

Figure 1:
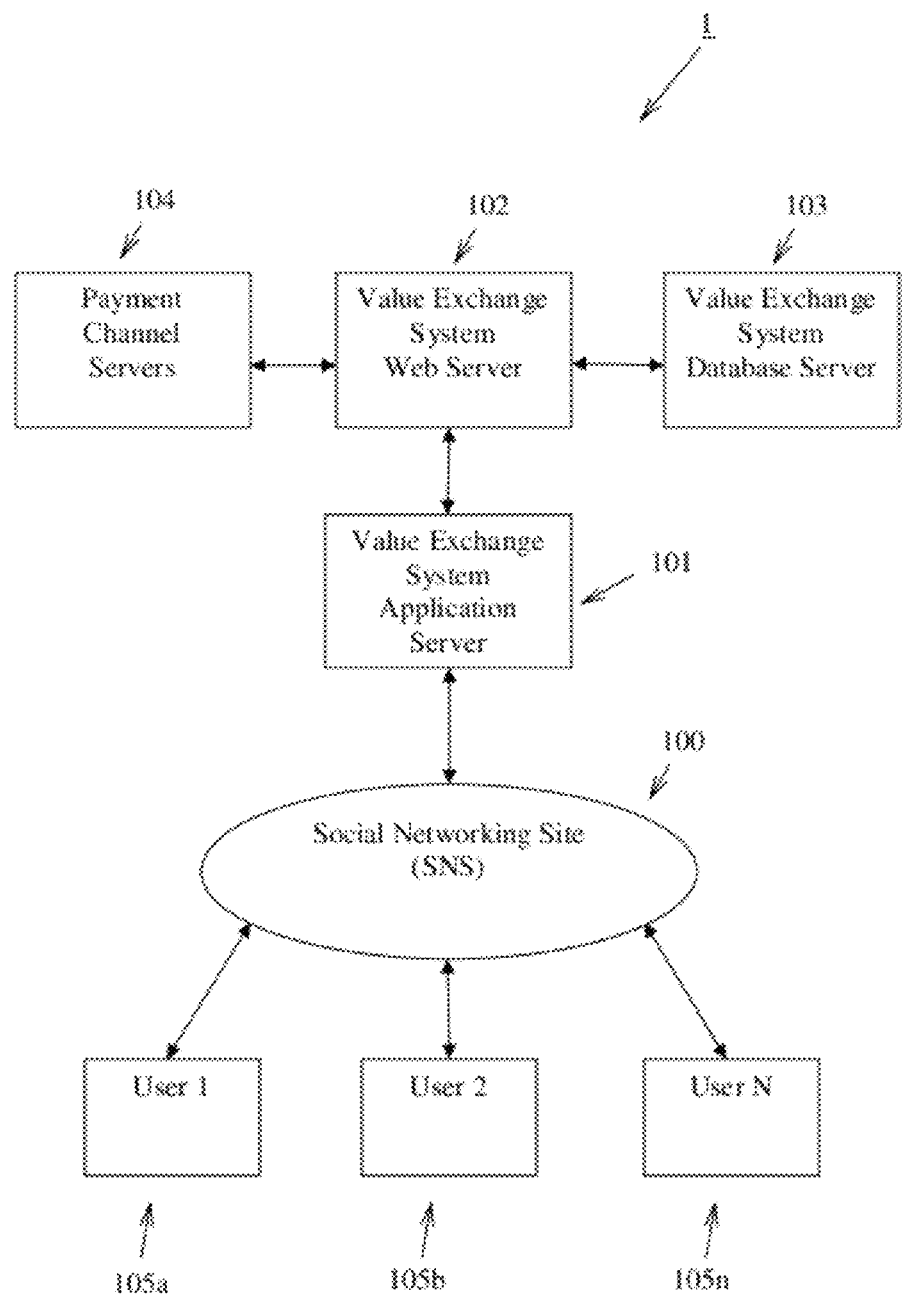
FIG. 1 is an illustration of an embodiment of the computer-implemented system of enabling a value exchange between users of a social networking site (SNS) functioning within the confines of the SNS, in accordance with the present invention.

FIG. 1 illustrates an embodiment of the computer-implemented system 1 of enabling a value exchange between users 105a, 105b of a social networking site (SNS) 100 that functions within the confines of the SNS, according to the invention. The system comprises of an application server 101 for the value exchange system application, a web server 102 for the value exchange system, a data base server 103 for the value exchange system and a payment channels server 104. The data base server and payment channels server are interconnected to the web server, which is in turn interconnected to the application server.

The application server 101 is interconnected to the SNS and stores the value exchange system application program. This application is the interface to the value exchange system through which members of the SNS who after logging into their SNS account, can link and allow the value exchange system application access to their respective SNS account and register with the computer-implemented value exchange system, and through which members of the SNS who have already registered with the value exchange system as users are able to carry out value exchange transactions within the confines of the SNS. It is conceivable that the application server may store more than one version of the value exchange system application program, to cater to different SNSs.

The web server 102 stores the value exchange system program which the value exchange system application stored on the application server 101 provides an interface to. The value exchange system program stored on the web server is responsible for providing:

a means for registration to enable a member of the SNS to register with the value exchange system, and for the member to be assigned an account with the value exchange system after registration and also to input a preferred security password, a means for receiving a value exchange transaction between a first user and a second user, where the users are members of the same SNS and the value exchange system makes use of the SNS account identifiers of the respective users to enable the communication of value exchange transactions between the users, a notification means for computer generation of notifications of the value exchange transactions between the first and second users, and for the electronic transmission of such notifications, a value exchange means for debiting from or crediting to the value exchange system account of the first user the value to be exchanged in a value exchange transaction, and correspondingly crediting to or debiting from the value exchange system account of the second user the value to be exchanged.

The data base server 103 is interconnected to the web server 102 and stores the details of each user's account, such as user profiles, user account identifiers and account passwords, value exchange transaction records, account balances, product details and payment channel information, all of which are generated by the value exchange system program, and communicated to the data base server 103 by the web server 102.

One or more payment channel servers 104, each one being unique to a payment channel, are interconnected to the web server 102, and provides an interface with the various financial institutions through which any user transaction to introduce value to his/her value exchange system account such as banks, credit card companies, electronic payment systems and servers, amongst others. Details of all such payment transactions conducted are communicated to the web server 102, and are in turn recorded and stored in the data base server 103.

Although not shown, the embodiment of the computer-implemented system 1 of enabling a value exchange between users 105a, 105b of a SNS 100 that functions within the confines of the SNS illustrated in FIG. 1 may also incorporate security features which are known to persons skilled in the art, such as firewalls and security servers to provide a measure of security against illegal access and fraudulent use of a user's value exchange system account.

Figure 2A:
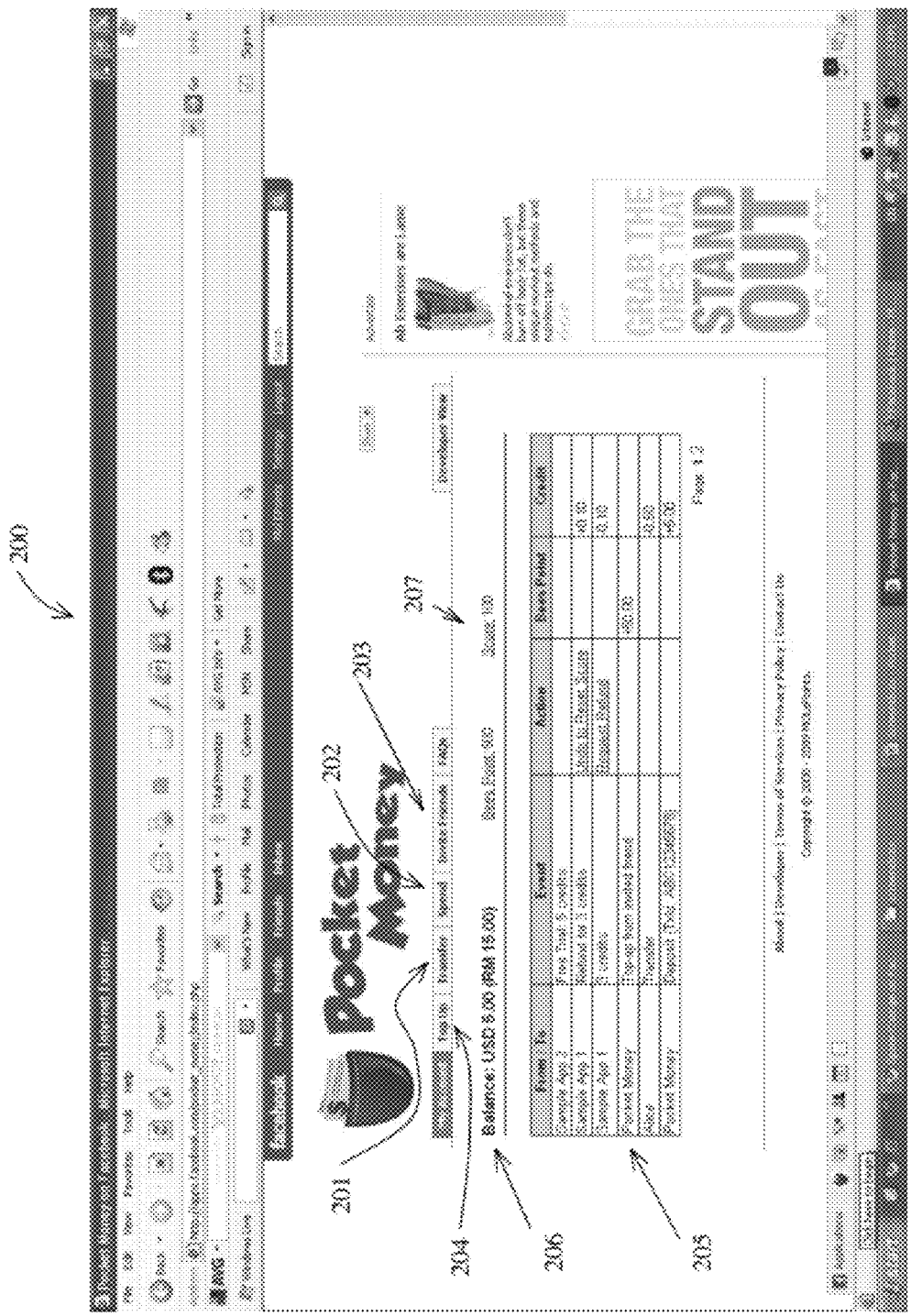
FIG. 2A is an illustration of an embodiment of the application for the computer-implemented method of enabling a value exchange between users of a social networking site (SNS) functioning within the confines of the SNS, according to the invention.

FIG. 2A illustrates an embodiment of the application for computer-implemented value exchange system according to the present invention, which provides users with an interface to the computer-implemented value exchange system within the confines of the SNS. The preferred embodiment of the application for computer-implemented value exchange system according to the present invention is typically a graphical user interface (GUI) 200 which comprises at least of:

a. an interface for enabling a value exchange transaction between users, such as one or more command buttons 201, 202, 203 linked to the value exchange system program for effecting a transfer of funds to another user, or for effecting a request for funds from another user, b. an interface for enabling a user to introduce value (to top up) his/her value exchange system account, such as a command button 204 linked to the value exchange system program for effecting the transfer of funds from a payment channel to a value exchange system account, c. a computer generated transaction log 205 for displaying the value exchange transactions that have taken place or are pending, based on the record of value exchange transactions carried out by the user, which is stored in the data base server, d. a computer generated indicator 206 for displaying the value stored in a user's value exchange system account which is based on the user's value exchange system account balance information stored in the data base server, and e. a computer generated indicator 207 for displaying a user's credit rating score in a user's value exchange system account, which is based on the record of value exchange transactions carried out by the user stored in the data base server.

Figure 2B:
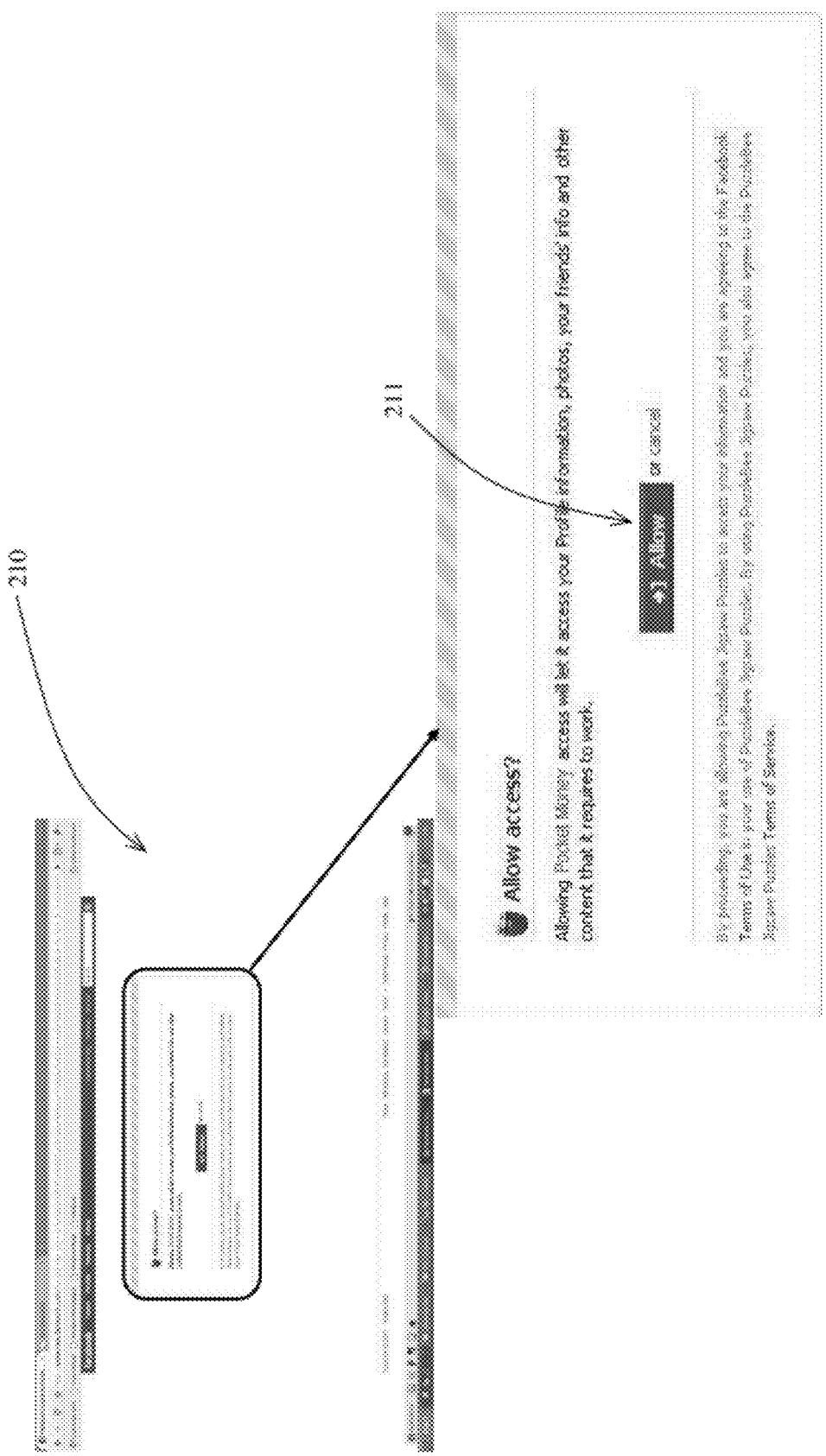
FIG. 2B is an illustration of an embodiment of the interface for enabling a member of a SNS to allow access and link the computer-implemented value exchange system application to his/her SNS account.

The embodiment of the application for computer-implemented value exchange system according to the present invention also comprises an interface 210, typically a graphical user interface (GUI) for enabling a member of a SNS to link and allow the computer-implemented value exchange system application access to his/her SNS account, an embodiment of which is shown in FIG. 2B.

Figure 2C:
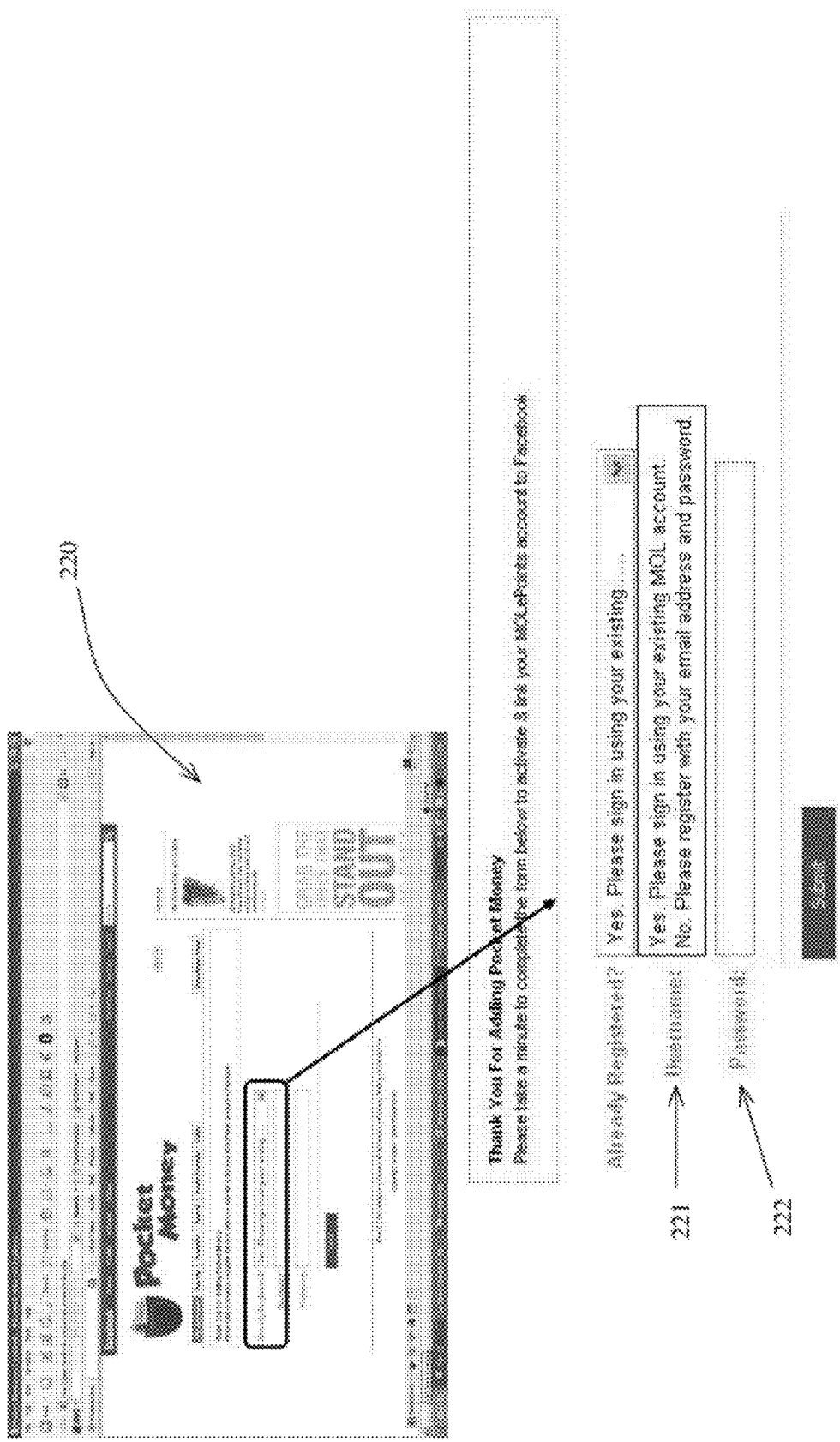
FIG. 2C is an illustration of an embodiment of the application's registration interface.

The embodiment of the application for computer-implemented value exchange system according to the present invention also comprises an interface 220, typically a graphical user interface (GUI) for enabling a member of a SNS to register as a user with the computer-implemented value exchange system, and be assigned an account with the computer-implemented value exchange system, the interface typically comprising data entry fields 221, 222 for a new user to input his/her user information and a preferred password for accessing his/her value exchange system account, and for a registered user to access his/her computer-implemented value exchange system account, an embodiment of which is shown in FIG. 2C, As there are already several SNSs in existence each with features and functions unique to it, in order for the computer-implemented system for value exchange application to be used within the confines of a specific SNS, a version of the application written in accordance with the Application Programming Interface of that SNS will be required in order for the application to function in that SNS.

Figure 3:
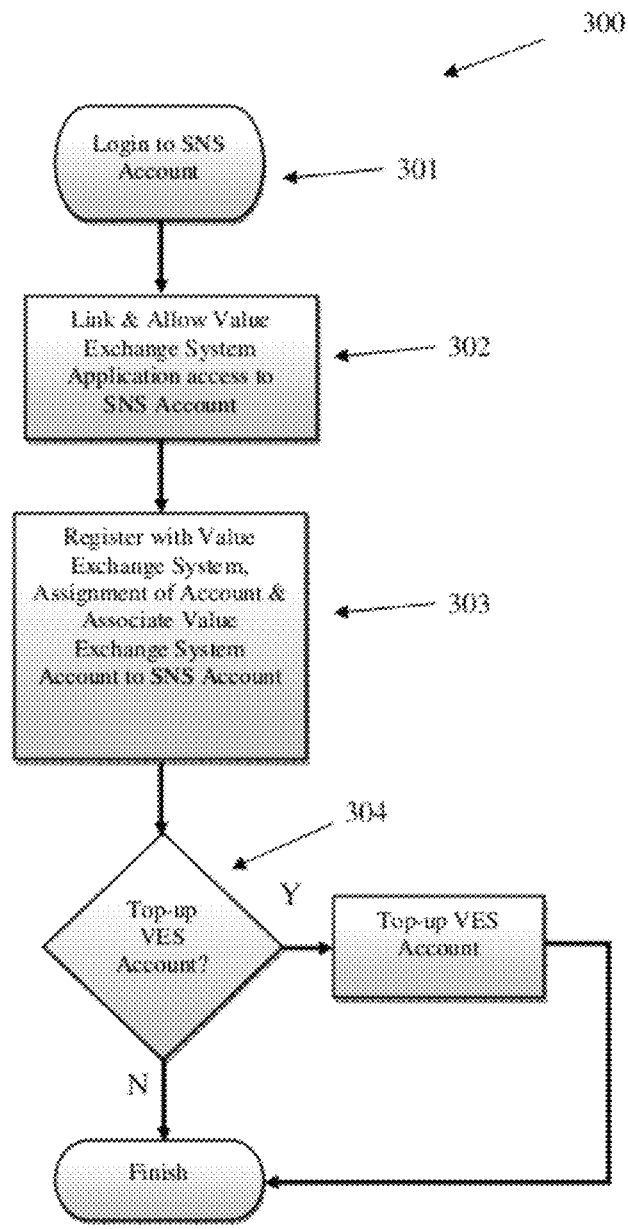
FIG. 3 is a flow chart illustrating the procedure of a user linking and allowing the value exchange system application access to his/her SNS account.

FIG. 3 illustrates the registration procedure 300 for the value exchange system. In order to make use of the value exchange system to carry out any value exchange transaction, a user who is member of the SNS must first access (e.g. log in to) his/her SNS account (step 301). Having done so, the user then links and allows the value exchange system application access to his/her SNS account (step 302), or in SNS parlance 'adds' the application to his/her SNS account using the interface 210 shown in FIG. 2B. The user confirms his/her intention by activating the command button 211.

Next, in step 303, and still within the user's SNS login session, the value exchange system will generate an interface 220, in which the user is required to input in the appropriate data entry fields 221, 222, his/her e-mail address or SNS account identifier, and also a preferred password which will both be required for the user to access his/her value exchange system account in the future. Other user information such as the user's name, residence address and/or billing address may also be required to complete the registration process. In the process of registration, the user's SNS account identifier, typically a 'username' or a 'nickname', will be associated with the user's value exchange system account to enable communication of value exchange transactions carried out respective to other users who are members of the same SNS.

Finally, upon completion of step 303, the user may in step 304 decide whether to introduce value to his/her account at that time. The user may introduce value to his/her value exchange system account at any time by logging in to the SNS, and accessing his/her value exchange system.

The process of being assigned a value exchange system account may be a one-time procedure, where a user who has already registered with the value exchange system through a first SNS which he/she is a member of, may associate his/her existing value exchange system account with the account identifier of a second SNS which the user is also a member of.

The process of associating a second SNS account to the user's existing value exchange system account also requires that the user link and allow the value exchange transaction system application access to his/her account with the second SNS. In this situation, a user completes the registration process by logging into his/her existing value exchange system account, and associating the account identifier of the second SNS account to the existing value exchange system account. A user may in effect associate the SNS account of any number of SNSs which he/she is a member of to his/her existing value exchange system account.

In the embodiment of the invention, a user who has registered with the value exchange system and has been assigned a value exchange system account need only login to the SNS in order to carry out a value exchange transaction. Additional security features such as the need for a user to input a password to access the value exchange system before conducting a value exchange transaction may be incorporated as required. Alternatively, login to the value exchange system may be required for certain types of action only, such as updating the user's account information.

In an embodiment of the invention, a first user conducts a value exchange transaction relative to a second user. In this case, both the first user and the second user are members of a SNS, and have each allowed access and linked to their respective SNS account, the application which creates an interface to the computer implemented value exchange system, which each user has registered with and have been assigned an account, which each user has associated to their respective SNS account.

Figure 4A:
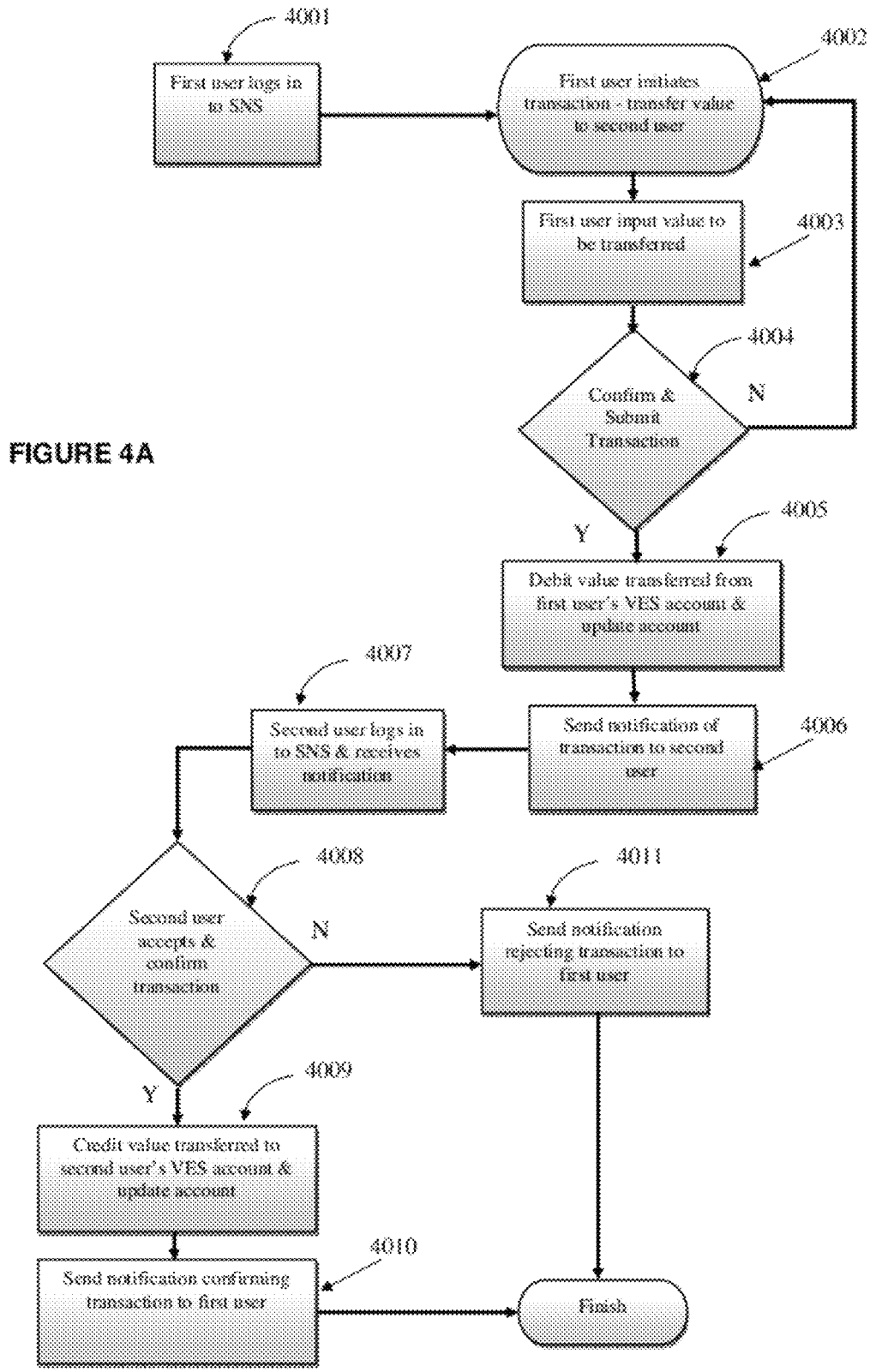
FIG. 4A is a flow chart illustrating the computer-implemented method of enabling a value exchange between users of a SNS which functions within the confines of the SNS, where the value exchange transaction is a transfer of value from a first user to a second user.

FIG. 4A illustrates the value exchange transaction in which the first user transfers value (e.g., funds) from his/her value exchange system account to a second user. The computer-implemented method of enabling a value exchange between the first user and a second user comprises the steps of the first user logging in to the SNS (step 4001), and conducting relative to a second user, a value exchange transaction which includes a value to be exchanged between the first user and the second user, using only the value exchange system application transaction (steps 4002, 4003, 4004). The value exchange system then debits from the first user's value exchange system account the value to be exchanged (step 4005), and sends a notification of the value exchange transaction to the second user's SNS account, notifying the second user of the transaction to accept the value exchange transaction (step 4006). When the second user logs in to the SNS, and upon receiving the notification from the value exchange system (step 4007), and accepts the value exchange transaction using the application (step 4008), the value exchange system credits to the second user's value exchange system account the value exchanged (step 4009), and sends a notification confirming the completion of the value exchange transaction to the first user's SNS account (step 4010). If the second user decides not to accept the value exchange transaction at step 4008, the value exchange system sends a notification of the rejection to the first user (step 4011).

Figure 4B:
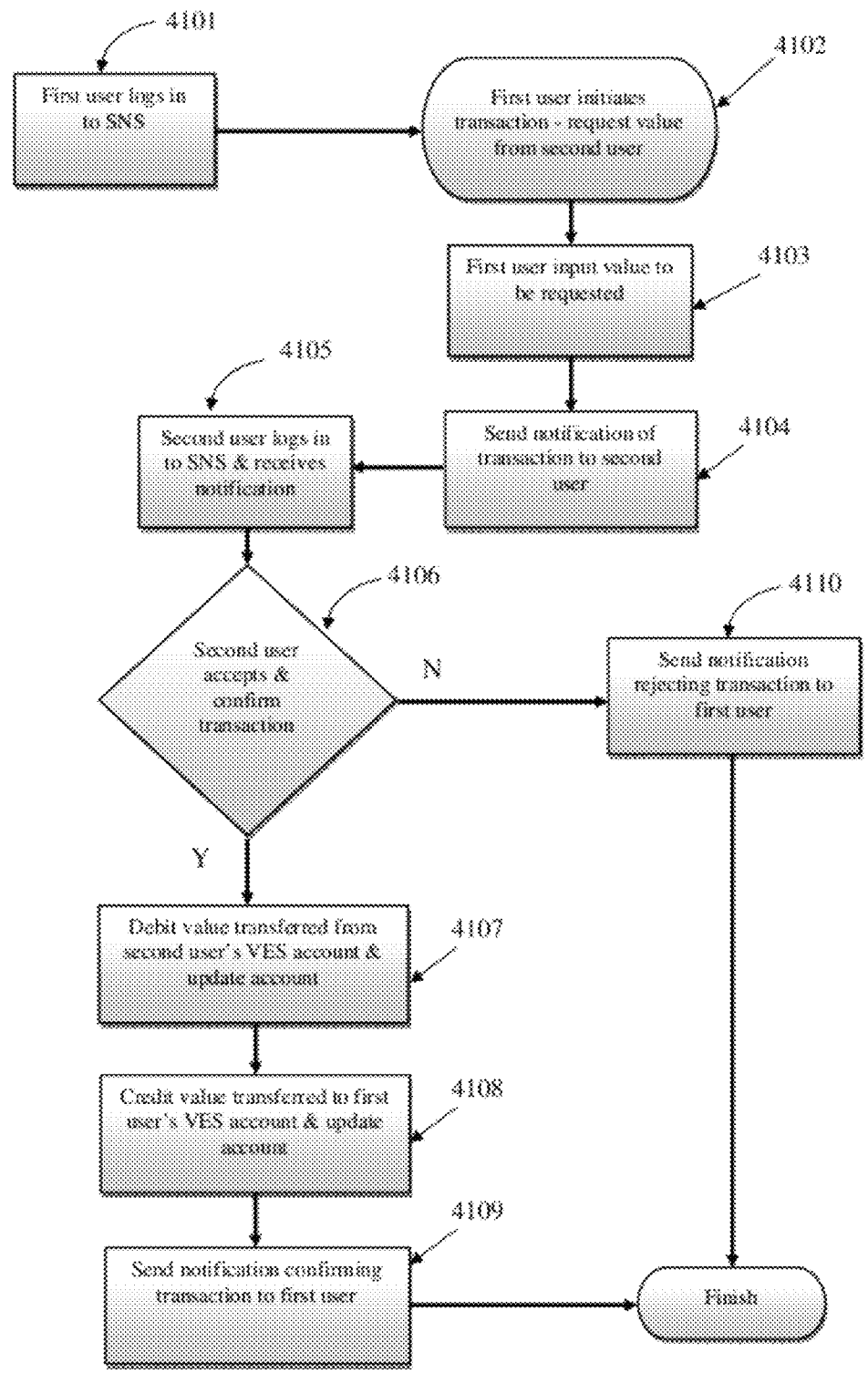
FIG. 4B is a flow chart illustrating the computer-implemented method of enabling a value exchange between users of a SNS which functions within the confines of the SNS, where the value exchange transaction is a request of value made by a first user to a second user.

FIG. 4B illustrates the value exchange transaction in which the first user requests for value (e.g., funds) from a second user, the computer-implemented method of enabling a value exchange between the first user and a second user comprises the steps of the first user logging in to the SNS (step 4101), and conducting relative to a second user, a value exchange transaction which includes a value to be exchanged between the first user and the second user, using the value exchange system application (steps 4102, 4103). The value exchange system sends a notification of the value exchange transaction to the second user's SNS account, notifying the second user of the transaction to accept the value exchange transaction (step 4104). When the second user logs in to the SNS, and upon receiving the notification from the value exchange system (step 4105), accepts the value exchange transaction using only the application (step 4106), the value exchange system debits from the second user's value exchange system account the value to be exchanged (step 4107), and credits to the first user's value exchange system account the value exchanged (step 4108), and a notification confirming the completion of the value exchange transaction is sent to the first user's SNS account (4109). If the second user decides not to accept the value exchange transaction at step 4106, the value exchange system sends a notification of the rejection to the first user (step 4110).

In another embodiment of the invention, a first user conducts a value exchange transaction relative to a second user. In this scenario, whilst both the first user and the second user are members of the SNS, either the first user or the second user has not allowed access and linked to their respective SNS account, the application which creates an interface to the computer implemented value exchange system, and registered with the value exchange system.

Figure 4C:
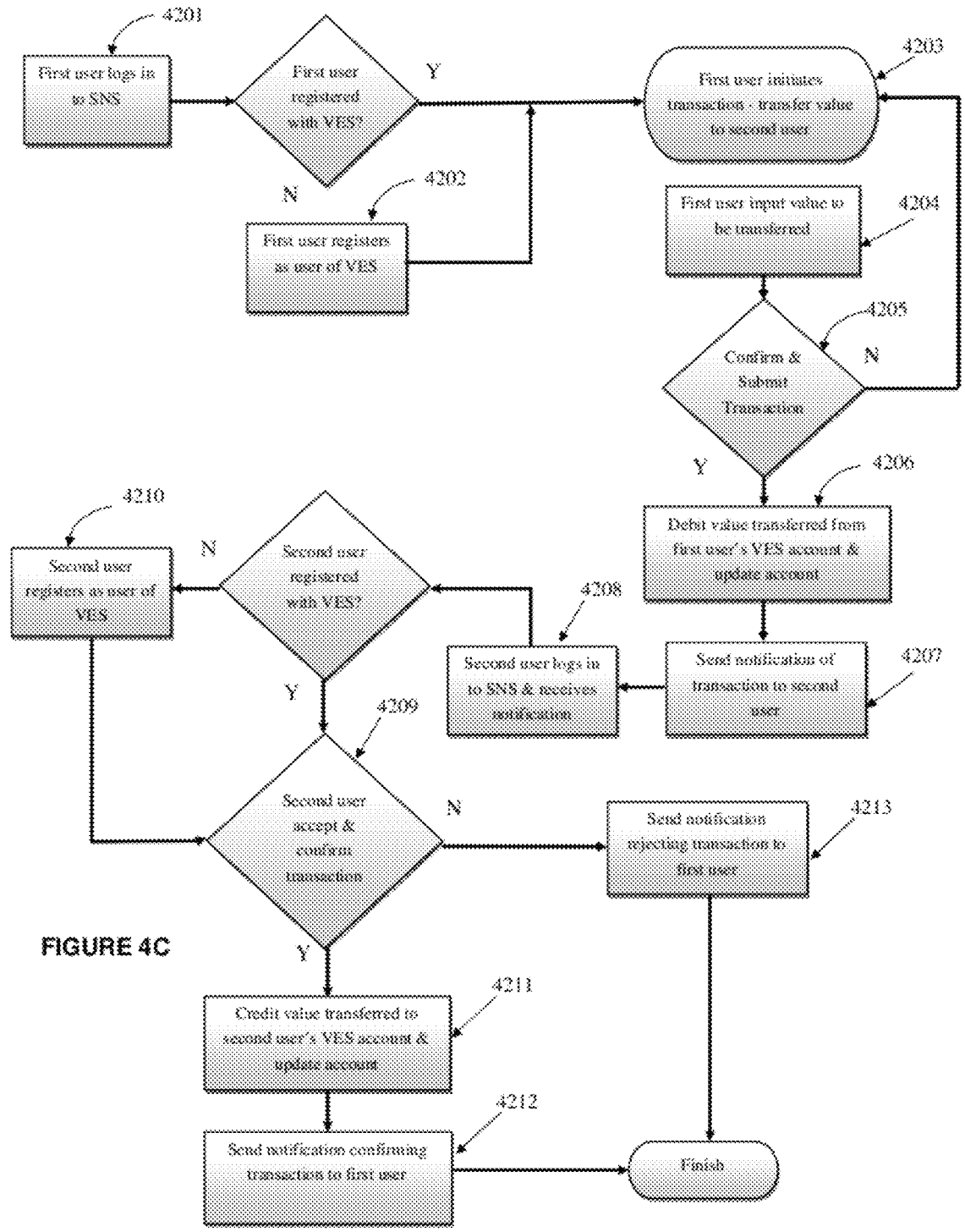
FIG. 4C is a flow chart illustrating the computer-implemented method of enabling a value exchange between users of a SNS which functions within the confines of the SNS, where the value exchange transaction is a transfer of value from a first user to a second user, and either the first user or the second user is not registered with the value exchange system.

FIG. 4C illustrates the value exchange transaction involving the transfer of value (e.g., funds) by the first user from his/her value exchange system account to a second user, and the first user has not allowed access and linked to his/her SNS account, the application which creates an interface to the computer implemented value exchange system and registered with the value exchange system. The computer-implemented method of enabling a value exchange between the first user and a second user comprises the steps of the first user first logging in to the SNS (step 4201) and allowing access and linking to his/her SNS account, the application which creates an interface to the computer implemented value exchange system, registering with the value exchange system and being assigned an account with the value exchange system which the first user associates to his/her SNS account (step 4202). Registration and assignment of an account with the value exchange system and the introduction of value to the account are requirements, before the first user may conduct relative to a second user, a value exchange transaction which includes a value to be exchanged between the first user and the second user, using only the value exchange system application (steps 4203, 4204, 4205). The value exchange system will then debit from the first user's value exchange system account the value to be exchanged (step 4206), and send a notification of the value exchange transaction to the second user's SNS account, notifying the second user of the transaction to accept the value exchange transaction (step 4207). When the second user logs in to the SNS, and upon receiving the notification from the value exchange system (step 4208), accepts the value exchange transaction using only the application (step 4209), the value exchange system credits to the second user's value exchange system account the value exchanged (step 4211), and sends a notification confirming the completion of the value exchange transaction to the first user's SNS account (step 4212). If the second user decides not to accept the value exchange transaction at step 4209, the value exchange system sends a notification of the rejection to the first user (step 4213).

FIG. 4C also illustrates the value exchange transaction in which the first user transfers value (e.g., funds) from his/her value exchange system account to a second user who has not allowed access and linked to his/her SNS account, the application which creates an interface to the computer implemented value exchange system and registered with the value exchange system. The computer-implemented method of enabling a value exchange between the first user and a second user comprises the steps of the first user logging in to the SNS (step 4201), and conducting relative to a second user, a value exchange transaction which includes a value to be exchanged between the first user and the second user, using only the value exchange system application (steps 4203, 4204, 4205). The value exchange system will then debit from the first user's value exchange system account the value to be exchanged (step 4206), and then send a notification of the value exchange transaction to the second user's SNS account, notifying the second user of the transaction to accept the value exchange transaction (step 4207). When the second user logs in to the SNS (step 4208), he/she receives the notification from the value exchange system which preferably contains a hyperlink to the value exchange system application, inviting the second user to allow access and link to his/her SNS account, the application which creates an interface to the computer implemented value exchange system, register with the value exchange system and be assigned an account with the value exchange system which the second user associates to his/her SNS account (step 4210). Upon completion of the registration procedure, the second user accepts the value exchange transaction using only the application (step 4209). The value exchange system then credits to the second user's value exchange system account the value exchanged (step 4211), and sends a notification confirming the completion of the value exchange transaction to the first user's SNS account (step 4212). If the second user decides not to accept the value exchange transaction at step 4209, the value exchange system sends a notification of the rejection to the first user (step 4213).

Figure 4D:
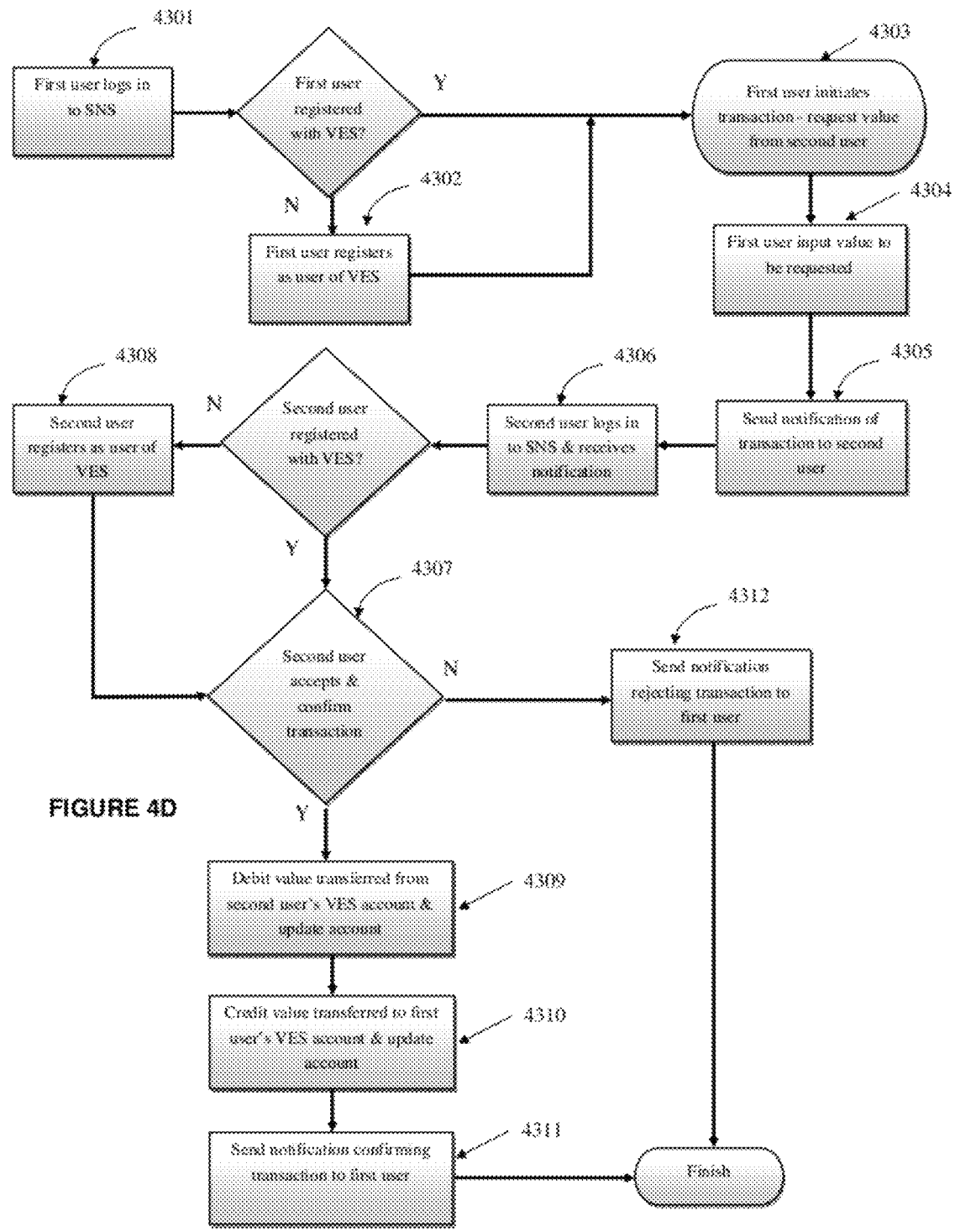
FIG. 4D is a flow chart illustrating the computer-implemented method of enabling a value exchange between users of a SNS which functions within the confines of the SNS, where the value exchange transaction is a request of value made by a first user to a second user, and either the first user or the second user is not registered with the value exchange system.

FIG. 4D illustrates the value exchange transaction in which the first user requests for value (e.g., funds) from a second user, and the first user has not allowed access and linked to his/her SNS account, the application which creates an interface to the computer implemented value exchange system and registered with the value exchange system, the computer-implemented method of enabling a value exchange between the first user and a second user comprises the steps of the first user first logging in to the SNS (step 4301) and allowing access and linking to his/her SNS account, the application which creates an interface to the computer implemented value exchange system, registering with the value exchange system and being assigned an account with the value exchange system which the first user associates to his/her SNS account (step 4302), and conducting relative to a second user, a value exchange transaction which includes a value to be exchanged between the first user and the second user, using only the value exchange system application (steps 4303, 4304). The value exchange system sends a notification of the value exchange transaction to the second user's SNS account, notifying the second user of the transaction to accept the value exchange transaction (step 4305). When the second user logs in to the SNS (step 4306), and upon receiving the notification from the value exchange system, accepts the value exchange transaction using only the application (step 4307), the value exchange system debits from the second user's value exchange system account the value to be exchanged (step 4309), and credits to the first user's value exchange system account the value exchanged (step 4310), and sends a notification confirming the completion of the value exchange transaction to the first user's SNS account (4311). If the second user decides not to accept the value exchange transaction at step 4308, the value exchange system sends a notification of the rejection to the first user (step 4312).

FIG. 4D also illustrates the value exchange transaction in which the first user requests for value (e.g., funds) from a second user, and the second user has not allowed access and linked to his/her SNS account, the application which creates an interface to the computer implemented value exchange system and registered with the value exchange system, the computer-implemented method of enabling a value exchange between the first user and a second user comprises the steps of the first user logging in to the SNS (step 4301), and conducting relative to a second user, a value exchange transaction which includes a value to be exchanged between the first user and the second user, using the value exchange system application (steps 4303, 4304). The value exchange system sends a notification of the value exchange transaction to the second user's SNS account, notifying the second user of the transaction to accept the value exchange transaction (step 4305). When the second user logs in to the SNS, he/she receives the notification from the value exchange system which preferably contains a hyperlink to the value exchange system application (step 4306), inviting the second user to allow access and link to his/her SNS account, the application which creates an interface to the computer implemented value exchange system, register with the value exchange system and be assigned an account with the value exchange system which the second user associates to his/her SNS account and to introduce value to the account (step 4308). Upon completion of the registration procedure and after introducing value to his/her value exchange system account, the second user accepts the value exchange transaction using only the application (step 4307). The value exchange system debits from the second user's value exchange system account the value to be exchanged (step 4309), and credits to the first user's value exchange system account the value exchanged (step 4310), and a notification confirming the completion of the value exchange transaction is sent to the first user's SNS account (step 4311). If the second user decides not to accept the value exchange transaction at step 4308, the value exchange system sends a notification of the rejection to the first user (step 4312).

In each of the value exchange transaction scenarios described above, the details of the transaction such as the date and time of the transaction, and also the value exchanged between the first user and second user, and the value debited and credited to each user's value exchange system account are also communicated to the data base as a record of the transaction. Each value exchange transaction conducted successfully is displayed in the transaction log that may be accessed by a user when he/she has accessed his/her value exchange system account. The means for displaying the balance of the value stored in a user's value exchange system account is also adjusted accordingly to display the user's current balance.

The notification confirming that a value exchange transaction has been successfully concluded, is typically an electronic message utilizing a SNS's messaging function, and may additionally or alternatively be in the form of a computer generated message which is electronically transmitted, such as an e-mail or a short messaging service text message, to name a few. Other forms of electronic message generation and transmission may be envisioned by persons skilled in the art. Although such a notification may thus be external of the SNS, this is ancillary to the transaction itself which is conducted within the SNS login sessions of the parties to the transaction.

It is to be understood by any person skilled in the art that a value exchange transaction enabled by the computer-implemented value exchange system may only take place if a user has sufficient value or funds in his/her value exchange system account to transfer to another user. In the embodiment of the invention, in the event a user has insufficient funds or value to conduct a value exchange transaction, the computer-implemented value exchange system bars the user from conducting any value exchange transactions to transfer funds to another user, and in conjunction with the means for displaying the balance of the value stored in a user's value exchange system account, provides an indication to that effect and also prompts the user to introduce additional value or funds to his/her value exchange system account before permitting the user to conduct a value exchange transaction, or to continue with a 'barred' value exchange transaction.

Figure 5:
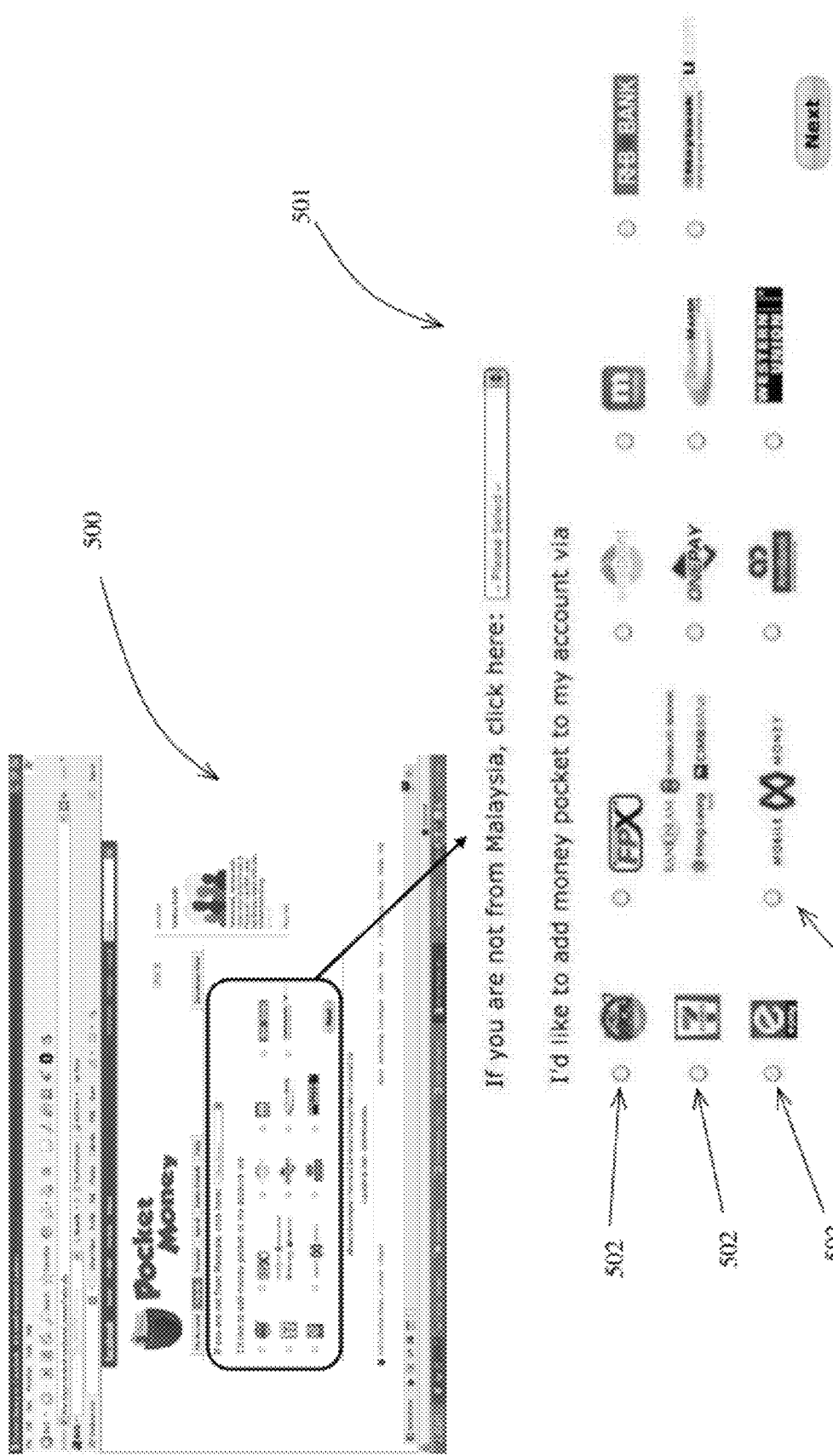
FIG. 5 is an illustration of the embodiment of the interface through which a user may introduce value his/her value exchange system account.

FIG. 5 illustrates the interface 500 through which a user may introduce additional value to (e.g., top up) his/her value exchange system account in the embodiment of the computer-implemented value exchange system according to the present invention. The interface comprises a menu 501 in which a user may select the preferred payment channel 502, from which value or funds are to be drawn from to 'top up' his/her value exchange system account. The menu 501 is typically a graphical user interface containing a selectable list of payment channels 502 subscribing to the value exchange system, and certainly the number and variety of payment channels available on a menu may be subject to increase, or limited according to a specific country's financial and banking regulations. The payment channels may comprise of both physical payment channels and virtual payment channels.

A user tops up his/her value exchange system account by selecting the top up interface, where upon doing so, the application then displays the menu containing the available payment channels. Upon selection of the preferred payment channel, the application then interfaces with the selected payment channel's 'top up' interface. The top up interface may vary according to the payment channel, and will typically comprise of data fields for the user to input the additional value to be introduced to his/her value exchange system account and if necessary, also a field for a security password.

A physical payment channel is so named, since the additional value is introduced into a user's value exchange system account by means of vouchers or tokens containing a specific value. These vouchers or tokens are purchased from a physical outlet, typically a convenience store, a vending machine specifically prepared to do so, or even by any other business outlet that subscribes to the sale of the vouchers or tokens. The vouchers or tokens may be in physical form and specific denominations, each containing a specific value, or may be in the form of an electronically generated voucher or token containing a value determined by a user at the time of purchase. The vouchers or tokens typically contain a unique serial number as a means of electronically identifying the top up transaction and value to be introduced to a user's value exchange account, and/or a security identification number to validate the top up transaction.

The embodiment of the computer-implemented value exchange system according to the present invention accepts vouchers or tokens issued by any physical payment channel that is compatible with the value exchange system, and which services or recognizes the value exchange system. A user may therefore purchase a voucher or token issued by any physical payment channel meeting these criteria, which in practice would comprise of vouchers or tokens issued by a number of different financial organizations.

Figure 6:
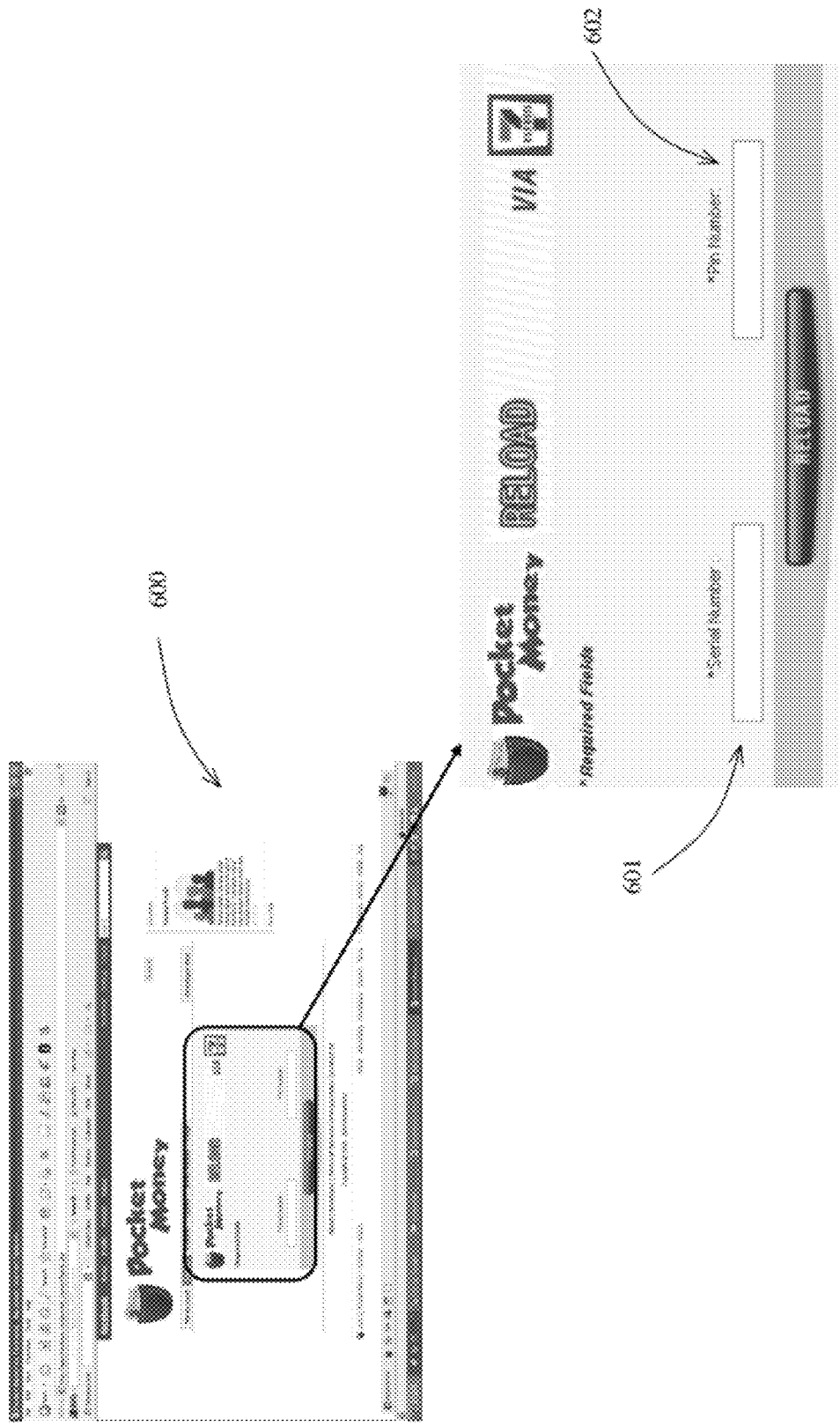
FIG. 6 is an illustration of the embodiment of the interface through which a user may introduce value to his/her value exchange system account, via a physical payment channel.

A user having purchased a voucher or token to introduce value to his/her value exchange account, logs in to the SNS and selects the top up interface 204 and subsequently, selects from the aforementioned menu 501, the payment channel 502 corresponding to the voucher or token. The top up interface then generates an interface 600, typically a graphical user interface (GUI) containing data entry fields 601, 602, an embodiment of which is illustrated in FIG. 6. The interface 600 is specific to the selected payment channel and is usually hosted on a payment channel server.

The user inputs the serial number and security identification number contained on the voucher or token purchased in the appropriate data entry fields 601, 602, and the details of the top up transaction are communicated by the value exchange system program to the relevant payment channel server for validation and confirmation of the transaction. Upon validation, the value introduced by the top up transaction is credited to the user's value exchange system account by the value exchange system program. A notification confirming that value has been successfully introduced to the user's value exchange system account is generated by the value exchange system program and sent to the user's SNS account. Details of the transaction such as the voucher or token serial number and security identification number, date and time of the transaction, and also the value introduced to the value exchange system account are also communicated to the data base as a record of the transaction, which is mirrored in the transaction log. The means for displaying the balance of the value stored in a user's value exchange system account is also adjusted accordingly to display the user's current balance.

A virtual payment channel is one where the additional value to be introduced to a user's value exchange system account is by means of an internet-based finance system, such as an internet banking facility, online credit card transaction or a third party payment wallet such as PayPal®. The examples quoted here and further examples are all well known to a person skilled in the art.

Figure 7:
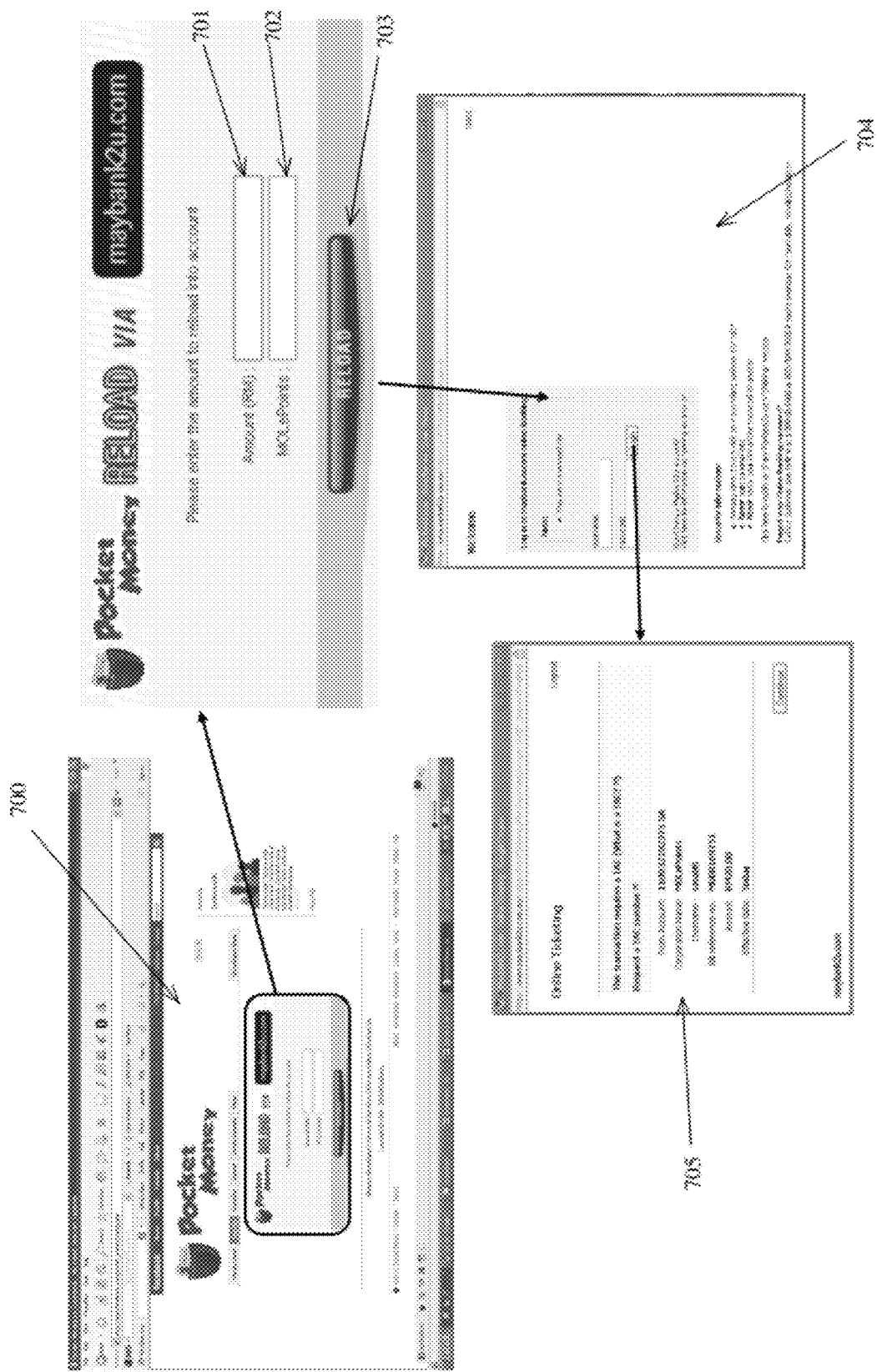
FIG. 7 is an illustration of the embodiment of the interface through which a user may introduce value to his/her value exchange system account, via a virtual payment channel.

A user using a virtual payment channel to top up his/her value exchange system account logs in to the SNS selects the top up interface 203 and subsequently, selects from the payment channel menu 501, the virtual payment channel 502 he/she intends to utilize. FIG. 7 illustrates an embodiment of a virtual payment channel, specifically a bank account with internet banking capability. Upon selection of this virtual payment channel, the top up interface generates an interface 700 to the selected virtual payment channel which requires the user to input in the data entry fields 701, 702 provided, the value he/she wishes to introduce to his/her value exchange system account and a command button 703 to confirm the value to be introduced. The details of the top up transaction are communicated by the value exchange system program to the relevant payment channel server for validation and confirmation of the transaction.

Upon successful completion of this step, the value exchange system program then generates an interface to the virtual payment channel's web page 704, in which a user is required to input further information relevant to the virtual payment channel, such as a username and password corresponding to his/her bank account, or credit card as the case may be. A virtual payment channel may introduce additional security features such as transaction access codes 705 corresponding to the value introduction transaction, which may be generated in situ by the virtual payment channel When this step is successfully completed, the value introduced by the top up transaction is credited to the user's value exchange system account by the value exchange system program. A notification confirming that value has been successfully introduced to the user's value exchange system account is generated by the value exchange system program and sent to the user's SNS account, and details of the transaction such as the date and time of the transaction, and also the value introduced to the value exchange system account are also communicated to the data base as a record of the transaction, which is mirrored in the transaction log. The means for displaying the balance of the value stored in a user's value exchange system account is also adjusted accordingly to display the user's current balance.

In yet a further embodiment of the of the computer-implemented system of enabling a value exchange between users of a social networking site (SNS) that functions within the confines of the SNS, according to the invention, a member of a SNS has the option of registering with the value exchange system as a merchant, and being assigned a merchant account with the value exchange system. A merchant may be a member of a SNS seeking to monetize an application through the provision of a product or a service to other members of a SNS in exchange for payment, or even a commercial entity carrying out an online business.

In the embodiment, a merchant account differs from a normal value exchange system account in that it comprises a more stringent registration process, requiring also the input of details of the merchant's business such as the name of the business, postal address, amongst others, and a value exchange transaction between a merchant and a user who is a member of the SNS will usually involve the transfer of value or funds by a user to a merchant as payment made in respect of the supply of a specific product or service, or for the refund of a payment made if deemed necessary by circumstances.

In the embodiment, a value exchange transaction involving the transfer of funds by a user to a merchant as payment made in respect of the supply of a specific product or service is identical to that illustrated in FIG. 4A described previously, with the exception that the first user is the party making payment in respect of a purchase, and the second user is a merchant receiving payment. A value exchange transaction involving the refund of a payment made, is identical to that illustrated in FIG. 4B described previously, with the exception that the first user is the party making the request for a refund, and the second user is the merchant making the refund.

The merchant value exchange system account in the embodiment of the present invention also comprises of a computer program to enable the merchant to present a product or service for sale, to designate a specific value for the product or service, to create user interfaces for the selection and purchase of a product or service by a user, to create user interfaces for payment to be made, and to deliver the product or service after payment is made. The merchant value exchange system also comprises of an interface for a merchant to convert any amount of the accumulated value stored in his/her account into currency.

The embodiments of the computer-implemented system of enabling a value exchange between users of a social networking site (SNS) that functions within the confines of the SNS, according to the invention as described above, imply the restriction of the use of the system solely to the confines of a specific SNS. In other words, a user of the computer-implemented value exchange system may only conduct a value exchange transaction with another user who is also a member of the same SNS. A computer-implemented value exchange system that enables 'cross SNS' value exchange transactions to be conducted by a first user and a second user who are each members of a different SNS is therefore envisioned in a further embodiment of the invention. In this embodiment of the invention, the computer-implemented value exchange system still makes use of the SNS account identifier of each user to enable the communication of value exchange transactions between the users, through a use of a universally compatible.

The features of the invention described herein refer only to embodiments of the computer-implemented system of enabling a value exchange between users of a social networking site (SNS) that functions within the confines of the SNS, and it will be obvious to persons skilled in the art that further embodiments may indeed be conceived or envisioned without departing from the scope of the present invention.

The invention claimed is:

1. A computer-implemented method of enabling a value exchange between a first user and a second user of an internet-based social network within the confines of the social network, said first user maintaining a first value exchange system account in a computer-implemented value exchange system and a first internet-based social network account, and said second user maintaining a second value exchange system account in the computer-implemented value exchange system and a second internet-based social network account, the method comprising:

receiving, by said computer-implemented value exchange system and from said first user, a selection of an interface associated with a physical payment channel corresponding to a physical payment form of said first user when said first user is logged-in to said first internet-based social network account, wherein said physical payment form is issued by a physical payment channel and purchased by a user from a physical outlet, wherein said physical payment form comprises any of a voucher and token representing value being introduced to a value exchange system account of a user;

generating, by said computer-implemented value exchange system, an interface corresponding to said physical payment channel corresponding to said physical payment form of said first user;

accepting, by said computer-implemented value exchange system and from said first user via the generated interface, said physical payment form from said first user;

validating, by said computer-implemented value exchange system, said physical payment form of said first user;

crediting, by said computer-implemented value exchange system, said first value exchange system account with a value being introduced by said physical payment form of said first user;

conducting, by said computer-implemented value exchange system, a value exchange transaction between said first user and said second user when said first user is logged-in to said first internet-based social network account, wherein said value exchange transaction includes a value to be exchanged between said first user and said second user;

debiting, by said computer-implemented value exchange system, said value to be exchanged from said first value exchange system account;

sending, by said computer-implemented value exchange system, an acceptance notification of said value exchange transaction from said computer-implemented value exchange system to said second internet-based social network account, said acceptance notification notifying said second user of said value exchange transaction and requiring said second user to confirm acceptance of said value exchange transaction;

receiving, by said computer-implemented value exchange system, a confirmation of the acceptance in said computer-implemented value exchange system from said second user when said second user is logged-in to said second internet-based social network account;

crediting, by said computer-implemented value exchange system, the value exchanged to said second value exchange system account when the confirmation of the acceptance of said value exchange transaction by said second user is received; and sending, by said computer-implemented value exchange system, a confirmation notification confirming completion of said value exchange transaction to said first internet-based social network account.

2. The computer-implemented method of claim 1, wherein said computer-implemented value exchange system makes use of one or more internet-based social network account identifiers of said first user and said second user to enable the communication of value exchange transactions between said first user and said second user.

3. The computer-implemented method of claim 1, wherein said computer-implemented value exchange system comprises a first application associated with said first internet-based social network account and a second application associated with said second internet-based social network account, wherein said first application comprising a first interface and said second application comprising a second interface, the method further comprising displaying, by said first interface and said second interface respectively, one or more value exchange transactions that have taken place or are pending, and the value stored in said first value exchange system account and said second value exchange system account respectively.

4. The computer-implemented method of claim 3, the method further comprising:

receiving, by said computer-implemented value exchange system, a request from said first user to allow access to said computer-implemented value exchange system and linking said first internet-based social network account of said first user with said first application;

registering, by said computer-implemented value exchange system, said first user with said computer-implemented value exchange system;

assigning, by said computer-implemented value exchange system, said first value exchange system account to the first user; and associating, by said computer-implemented value exchange system, said first value exchange system account assigned to said first user with said first internet-based social network account upon completing the registration of said first user with said computer-implemented value exchange system.

5. The computer-implemented method of claim 1, wherein said computer-implemented value exchange system comprises a first application associated with said first internet-based social network account and a second application associated with said second internet-based social network account, wherein said first application comprising a first interface and said second application comprising a second interface, the method further comprising displaying the balance of the value stored in any of the first and second value exchange system account.

6. The computer-implemented method of claim 1, wherein said computer-implemented value exchange system comprises a first application associated with said first internet-based social network account and a second application associated with said second internet-based social network account, said first application comprising a first interface and said second application comprising a second interface, the method further comprising displaying a credit rating score of any of said first user and said second user in the respective first internet-based and second internet-based value exchange system account.

7. The computer-implemented method of claim 1, wherein said value exchange system comprises a first application associated with said first internet-based social network account and a second application associated with said second internet-based social network account, said first application comprising a first interface and said second application comprising a second interface, said method further comprising:
  receiving a request from said second user to allow access to said value exchange system and linking said second internet-based social network account of said second user with said second application;
  registering said second user with said value exchange system;
  assigning said second value exchange system account to said second user; and
  associating said second value exchange system account assigned to said second user with said second-internet-based social network account upon completing a registration of said second user with said value exchange system.

8. The computer-implemented method of claim 1, wherein said value exchange system comprises a first application associated with said first internet-based social network account and a second application associated with said second internet-based social network account, said first application comprising a first interface and said second application comprising a second interface, said method further comprising:
  receiving a request from said second user to allow access to said value exchange system and linking said second internet-based social network account of said second user with said second application;
  registering said second user with said value exchange system;
  assigning said second value exchange system account to said second user; and
  associating said second value exchange system account assigned to said second user with said second-internet-based social network account upon completing a registration of said second user with said value exchange system.

9. The computer-implemented method of claim 1, further comprising:
  allowing, via said computer-implemented value exchange system, a user to introduce a value to a value exchange system account of said user through any of a multitude of payment channels; and
  generating, via said computer-implemented value exchange system, a notification confirming that said value has been introduced into said value exchange system account of said user.

10. The computer-implemented method of claim 9, wherein said multitude of payment channels comprises a physical payment channel.

11. The computer-implemented method of claim 10, wherein said physical payment channel comprises any of a pre-paid voucher and token.

12. The computer-implemented method of claim 9, wherein said payment channel comprises a virtual payment channel.

13. The computer-implemented method of claim 12, wherein said virtual payment channel comprises an internet banking facility.

14. The computer-implemented method of claim 1, wherein said acceptance notification comprises an electronic message utilizing a messaging function of said internet-based social network.

15. The computer-implemented method of claim 1, wherein said acceptance notification is computer generated and electronically transmitted.

16. The computer-implemented method of claim 1, further comprising allowing, via said computer-implemented value exchange system, a user to associate a value exchange system account of said user with accounts held by said user in more than one internet-based social network.

17. The computer-implemented method of claim 16, wherein said computer-implemented value exchange system comprises a first application associated with said first internet-based social network account and a second application associated with said second internet-based social network account, said first application comprising a first interface and said second application comprising a second interface, wherein said first application is configured according to operating requirements of said internet-based social network associated with said first user.

18. The computer-implemented method of claim 1, wherein:
  said second user is registered as a merchant with said computer-implemented value exchange system and is assigned a merchant account, wherein said second user has said merchant account associated with said second internet-based social network account; and
  said value exchange transaction is associated with a payment for a supply of any of a product and service offered by said second user.

19. The computer-implemented method of claim 18, wherein said computer-implemented value exchange system comprises a first application associated with said first internet-based social network account and a second application associated with said second internet-based social network account, said first application comprising a first interface and said second application comprising a second interface, wherein said first user is unregistered with said computer-implemented value exchange system, said method further comprising:
  receiving a request from said first user to allow access to said computer-implemented value exchange system and linking said first internet-based social network account of said first user with said first application;
  registering said first user with said computer-implemented value exchange system;
  assigning said first value exchange system account to said first user; and
  upon completing registration of said first user with said computer-implemented value exchange system, associating said first value exchange system account assigned to said first user with said first internet-based social network account.

20. The computer-implemented method of claim 18, further comprising permitting said second user to refund a value exchanged or reverse a value exchange transaction.

21. The computer-implemented method of claim 18, further comprising permitting said second user to convert any amount of accumulated value stored in said merchant account of said second user into currency.

22. A non-transitory program storage device readable by computer, and comprising a program of instructions executable by said computer to perform a computer-implemented method of enabling a value exchange between a first user and a second user of an internet-based social network within the confines of the social network, said first user maintaining a first value exchange system account in a computer-implemented value exchange system and a first internet-based social network account, and said second user maintaining a second value exchange system account in the computer-implemented value exchange system and a second internet-based social network account, the method comprising:

receiving, by said computer-implemented value exchange system and from said first user, a selection of an interface associated with a physical payment channel corresponding to a physical payment form of said first user when said first user is logged-in to said first internet-based social network account, wherein said physical payment form is issued by a physical payment channel and purchased by a user from a physical outlet, wherein said physical payment form comprises any of a voucher and token representing value being introduced to a value exchange system account of a user;

generating, by said computer-implemented value exchange system, an interface corresponding to said physical payment channel corresponding to said physical payment form of said first user;

accepting, by said computer-implemented value exchange system and from said first user via the generated interface, said physical payment form from said first user;

validating, by said computer-implemented value exchange system, said physical payment form of said first user;

crediting, by said computer-implemented value exchange system, said first value exchange system account with a value being introduced by said physical payment form of said first user;

conducting, by said computer-implemented value exchange system, a value exchange transaction between said first user and said second user when said first user is logged-in to said internet-based social network account, wherein said value exchange transaction includes a value to be exchanged between said first user and said second user;

debiting, by said computer-implemented value exchange system, said value to be exchanged from said first value exchange system account;

sending, by said computer-implemented value exchange system, an acceptance notification of said value exchange transaction from said computer-implemented value exchange system to said second internet-based social network account, said acceptance notification notifying said second user of said value exchange transaction and requiring said second user to confirm acceptance of said value exchange transaction;

receiving, by said computer-implemented value exchange system, a confirmation of the acceptance in said computer-implemented value exchange system from said second user when said second user is logged-in to said second internet-based social network account;

crediting, by said computer-implemented value exchange system, the value exchanged to said second value exchange system account when the confirmation of the acceptance of said value exchange transaction by said second user is received; and sending, by said computer-implemented value exchange system, a confirmation notification confirming completion of said value exchange transaction to said first internet-based social network account.

23. The program storage device of claim 22, wherein:

said second user is registered as a merchant with said computer-implemented value exchange system and is assigned a merchant account, wherein said second user has said merchant account associated with said second internet-based social network account; and said value exchange transaction is associated with a payment for a supply of any of a product and service offered by said second user.

24. The computer-implemented method of claim 1, wherein said first user and said second user comprise members of different internet-based social networks, and wherein said method further comprises making use of an internet-based social network account identifier of each of said first user and said second user to enable communication of value exchange transactions between said first user and said second user.

* * * * *